United States Patent [19]

Dresselhouse

[11] Patent Number: 5,163,769
[45] Date of Patent: Nov. 17, 1992

[54] BALL JOINT HAVING SERVICE LIFE INDICATOR

[75] Inventor: Kurt F. Dresselhouse, Oxford, Mich.

[73] Assignee: TRW, Inc., Lyndhurst, Ohio

[21] Appl. No.: 647,729

[22] Filed: Jan. 30, 1991

[51] Int. Cl.⁵ ............................................ F16C 11/06
[52] U.S. Cl. .................................... 403/27; 403/133; 403/140; 403/135
[58] Field of Search .............. 403/27, 132, 133, 139, 403/140, 135, 225, 226

[56] References Cited

U.S. PATENT DOCUMENTS

| | | |
|---|---|---|
| 3,068,031 | 12/1962 | Herbenar et al. . |
| 3,257,133 | 6/1966 | Wight ............................. 403/140 X |
| 3,355,787 | 12/1967 | Sullivan, Jr. . |
| 3,753,584 | 8/1973 | Kindel et al. . |
| 3,813,178 | 5/1974 | Herbenar et al. . |
| 3,960,457 | 6/1976 | Gaines et al. ......................... 403/27 |
| 4,017,197 | 4/1977 | Farrant . |
| 4,070,121 | 1/1978 | Graham . |
| 4,237,558 | 11/1980 | Snyder et al. .................. 403/226 X |
| 4,358,211 | 11/1982 | Goodrich, Jr., et al. . |
| 4,695,182 | 9/1987 | Wood, Jr. . |
| 4,712,940 | 12/1987 | Wood, Jr. ........................... 403/133 |
| 4,749,299 | 6/1988 | Swanson ............................... 403/27 |
| 4,890,949 | 1/1990 | Wood, Jr. ....................... 403/140 X |

*Primary Examiner*—Randolph A. Reese
*Assistant Examiner*—Heather Chun
*Attorney, Agent, or Firm*—Tarolli, Sundheim & Covell

[57] ABSTRACT

A ball joint comprises a socket, a stud, and an elastomeric bearing. The bearing is bonded to the ball end of the stud and supports the ball end of the stud for movement in the socket. The bearing has a service life indicator surface extending across an opening in the socket. The service life indicator surface is forced by the socket into a predetermined shape. The service life indicator surface moves out of its predetermined shape in response to separation of the bearing from the ball end of the stud.

10 Claims, 3 Drawing Sheets

BALL JOINT HAVING SERVICE LIFE INDICATOR

FIELD OF THE INVENTION

The present invention relates to a ball joint for vehicle wheel suspensions and steering linkages, and particularly relates to a ball joint having a service life indicator.

BACKGROUND OF THE INVENTION

Ball joints having wear indicators are well known. By way of example, U.S. Pat. No. 3,813,178 discloses a ball joint having a wear indicator. The ball joint of U.S. Pat. No. 3,813,178 includes a ball supported for movement in a socket. The ball is located between a load carrying bearing ring and a wear take-up bearing ring. The ball slides against the surfaces of the bearing rings when it moves in the socket. The wear take-up bearing ring is spring biased to move toward the load carrying bearing ring to take-up wear between the ball and the bearing rings. When the wear take-up bearing ring moves, a protrusion on the wear take-up bearing ring moves into the socket so that the amount of wear is indicated by the amount that the protrusion moves into the socket.

SUMMARY OF THE INVENTION

In accordance with the present invention, a ball joint comprises a socket, a stud, and an elastomeric bearing. The stud comprises a ball located in the socket and a shank extending from the ball out of a first opening in the socket. The bearing is bonded the ball and supports the ball for movement in the socket. Movement of the ball in the socket causes stresses which, over time, cause the bearing to separate from the ball. A service life indicator surface on the bearing extends at least partially across a second opening in the socket. The bearing is deformed between the socket and the ball to force the service life indicator surface into a predetermined shape. The service life indicator surface moves out of its predetermined shape in response to separation of the bearing from the ball.

BRIEF DESCRIPTION OF THE DRAWINGS

These and other features of the present invention will become apparent to those of ordinary skill in the art upon reading the following description of a preferred embodiment of the invention in view of the accompanying drawings, wherein.

DESCRIPTION OF A PREFERRED EMBODIMENT

Figure 1:
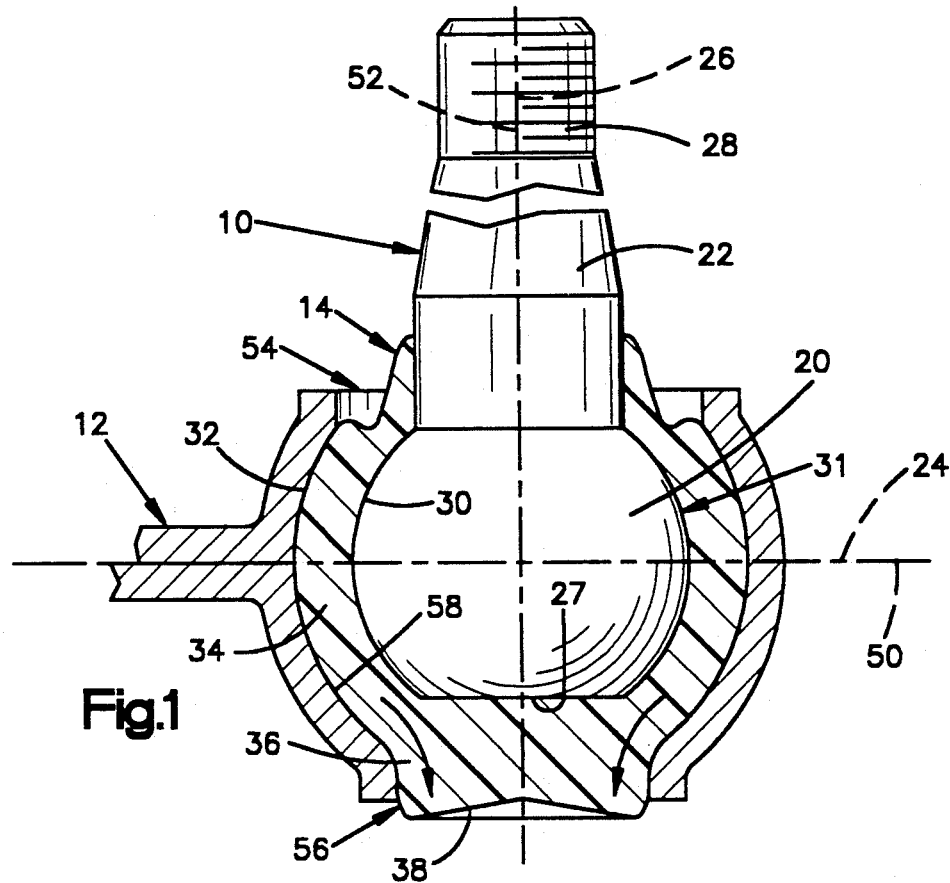
FIG. 1 is a partial sectional view of a ball joint having a service life indicator in accordance with the present invention.

As shown in FIG. 1, a ball joint in accordance with the present invention comprises a stud 10, a socket 12, and a bearing 14 supporting the stud 10 in the socket 12.

Figure 3:
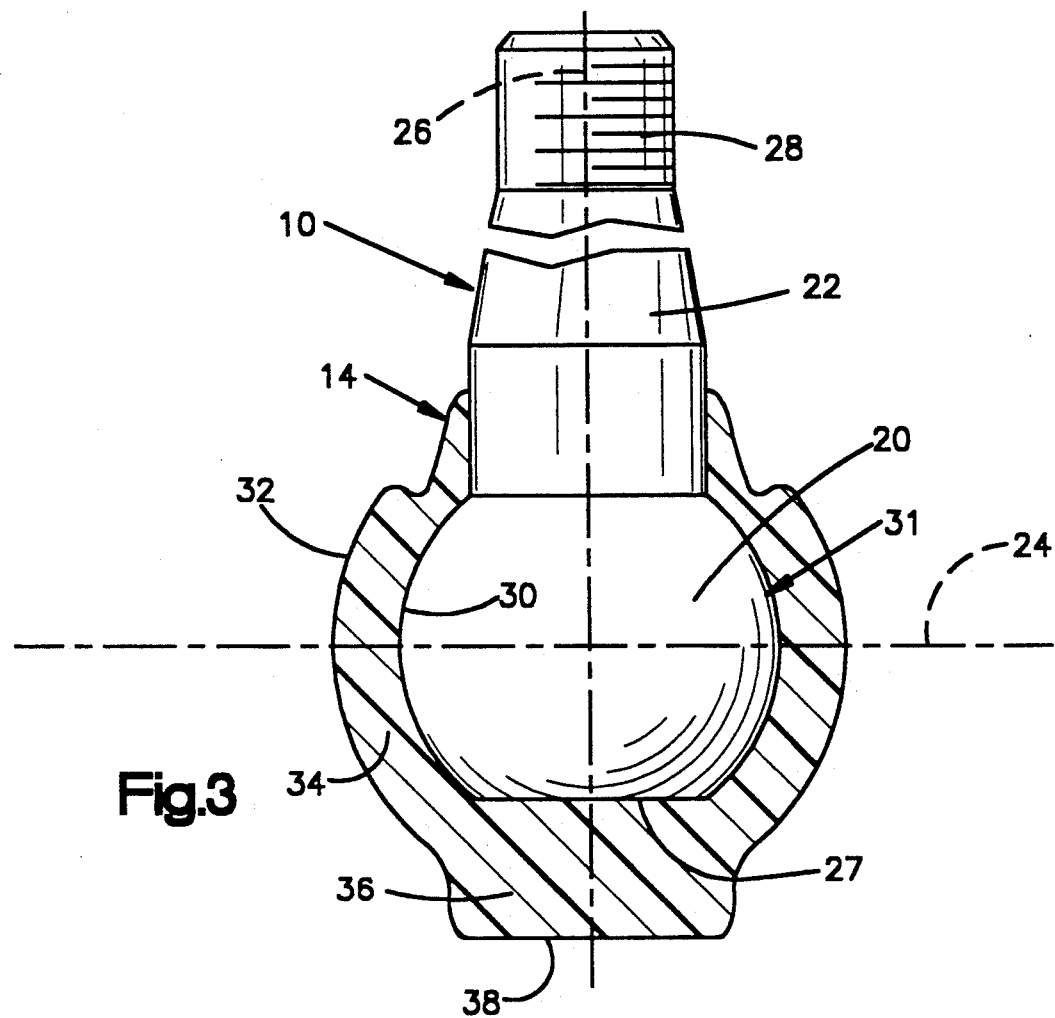
FIG. 3 is a sectional view of parts of the ball joint of FIG. 1 prior to assembly of the ball joint.

As shown in FIG. 3, the stud 10 comprises a ball 20 and a shank 22. The ball 20 has a horizontal axis 24, a vertical axis 26, and a horizontal flat surface portion 27. The shank 22 extends from the ball 20 longitudinally along the vertical axis 26, and has threads 28 for connecting the stud 10 to a vehicle suspension or steering linkage. The stud 10 is preferably formed of SAE 8115 modified or SAE 8615 steel which is cold formed or machined, carburized or carbonitrided to a 20-30 Rc core hardness and a 0.006-0.015 inch case depth, and supplied by Republic Steel Corp.

Figure 5:
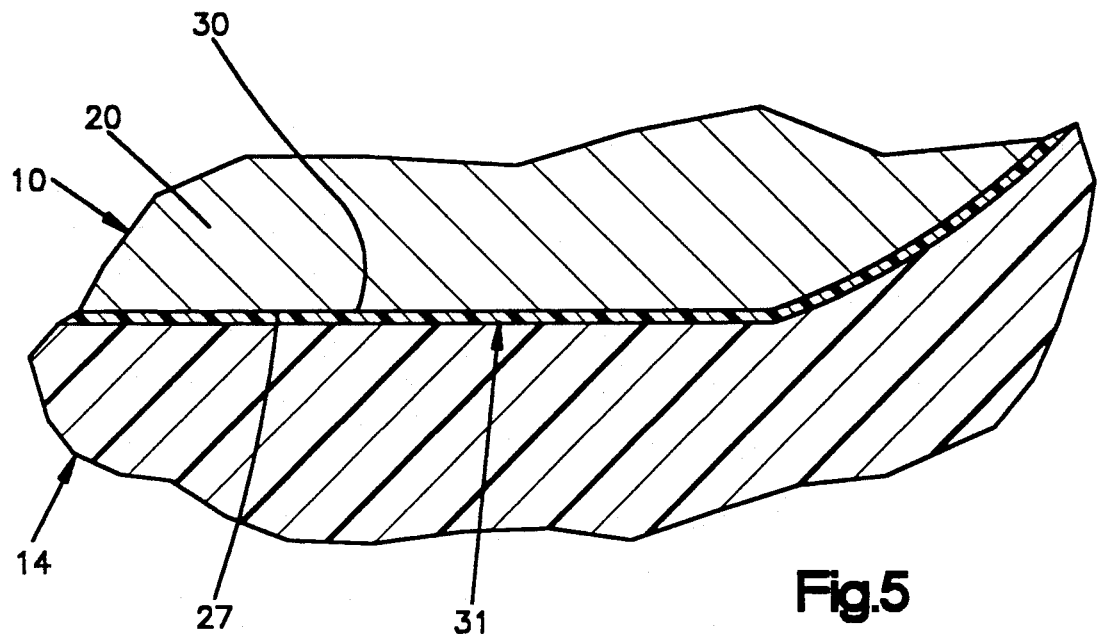
FIG. 5 is an enlarged partial view of the parts shown in FIG. 3.

The bearing 14 is formed of an elastomeric material. Preferably, the bearing 14 is formed of natural rubber (poly-isoprene) which is Banbury mixed and insert molded by injection or transfer molding, and supplied by Yale-South Haven, Inc. of South Haven, Mich. With further reference to FIG. 3, the bearing 14 has an inner surface 30 surrounding the ball 20 and an adjacent portion of the shank 22 so that the bearing 14 completely encapsulates the ball 20. The inner surface 30 of the bearing 14 is adhered to the surface of the ball 20 and to the adjacent portion of the shank 22. Chemlock adhesive, supplied by Hughson Chemical Co., is preferably used in a two step adhesive coating process to form a bond 31 (FIGS. 5 and 6) at which the inner surface 30 of the bearing 14 is adhered to the stud 10.

The bearing 14 also has an outer surface 32 which defines a main portion 34 of the bearing 14. The main portion 34 of the bearing 14 is substantially spherical, and is centered on the horizontal and vertical axes 24 and 26. The outer surface 32 also defines a service life indicator portion 36 of the bearing 14. The service life indicator portion 36 extends from the main portion 34 along the vertical axis 26, and is centered on the vertical axis 26. A portion of the outer surface 32 of the bearing 14 comprises a service life indicator surface 38 on the service life indicator portion 36.

Figure 4:
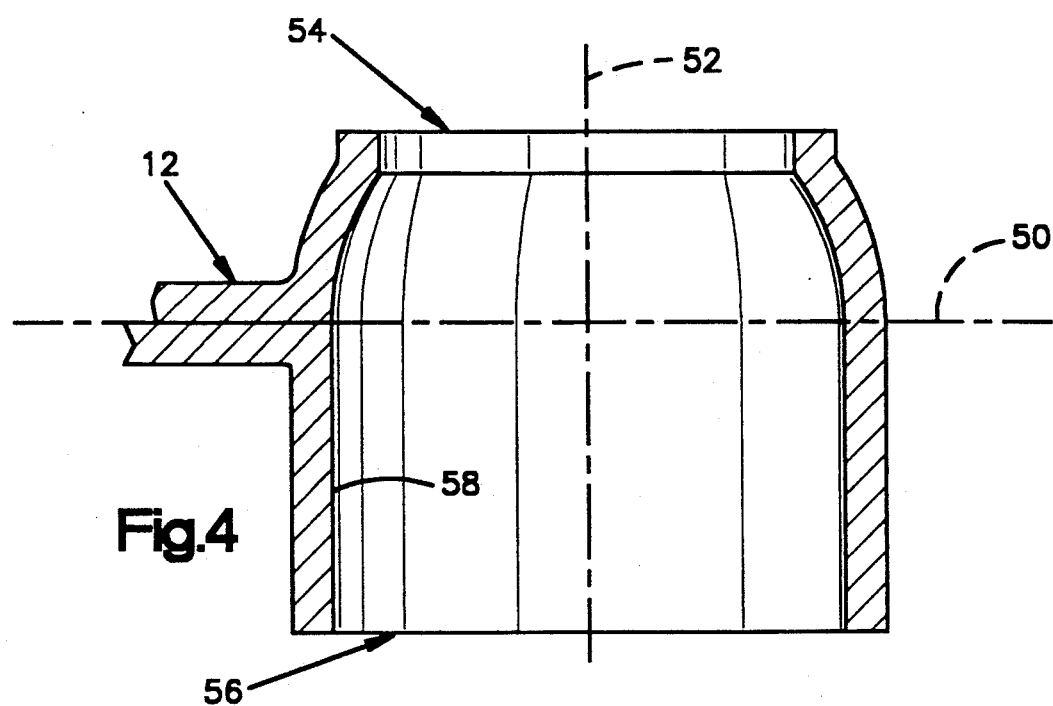
FIG. 4 is a partial sectional view of another part of the ball joint of FIG. 1 prior to assembly of the ball joint.

The socket 12 comprises a piece of metal which is shaped in a die forming process. Preferably, the socket 12 is formed of SAE XLF-950 steel, SAE 1010 steel, or SAE 1030 steel manufactured in a stamping or forging process. Such steel for the socket 12 is supplied by Worthington Steel Co. of Columbus, Ohio. The socket 12 takes the shape shown in FIG. 4 at one stage in the die forming process. As shown in FIG. 4, the socket 12 has a horizontal axis 50, a vertical axis 52, an upper opening 54 centered on the vertical axis 52, and a lower opening 56 centered on the vertical axis 52. An inner surface 58 of the socket 12 defines a chamber for insertion of the stud 10 and the bearing 14. An end portion of the socket 12 (not shown) remote from the chamber is connectable to a vehicle steering linkage in a known manner.

During assembly of the ball joint in accordance with the present invention, the stud 10 and the bonded bearing 14, as shown in FIG. 3, are inserted into the chamber in the socket 12 through the lower opening 56 as shown in FIG. 4. The socket 12 is then deformed in the die forming process from the shape shown in FIG. 4 to the shape shown in FIG. 1. The socket 12 is thus deformed around the bearing 14 to reduce the size of the lower opening 56 so that the stud 10 and the bearing 14 are supported in positions horizontally and vertically coaxial with the socket 12, as shown in FIG. 1.

When the socket 12 is deformed around the bearing 14, the volume of the chamber defined by the inner socket surface 58 is reduced. The volume of the elastomeric material of the bearing 14 located between the ball 20 and the inner socket surface 58 is likewise reduced. The elastomeric material is thus deformed and urged to move outwardly of the lower opening 56 in the socket 12. However, the bond 31 where the bearing 14 is adhered to the ball 20 holds the elastomeric material adjacent to the inner surface 30 from moving away from the ball 20. The elastomeric material can therefore more easily toward the lower opening 56 in the regions of the elastomeric material which are spaced radially from the bond 31 and the axis 26. This causes the periphery of the service life indicator portion 36 of the bearing 14 to bulge outwardly of the lower opening 56 more than the center thereof when the socket 12 is deformed around the bearing 14, as indicated by the arrows in FIG. 1. The service life indicator surface 38 is thus forced into a concave shape as shown in FIG. 1.

During use of the ball joint, the stud 10 moves relative to the socket 12, and the ball 20 moves within the chamber. The elastomeric material of the bearing 14 experiences elastic deformation between the moving ball 20 and the inner surface 58 of the socket 12. The elastically deformed bearing 14 exerts a bias resisting movement of the ball 20 and urging the ball 20 to return to its original position. The bearing 14 is thus stressed in response to movement of the ball 20 in the chamber. The stresses in the bearing 14 are greatest in the region of the bearing 14 adjacent to the flat surface portion 27 of the ball 20. The stresses experienced by the bearing 14 urge the elastomeric material of the bearing 14 to separate from the ball 20. This causes fatigue in the elastomeric material adjacent to the bond 31 which, over time, causes the elastomeric material adjacent to the bond 31 to break away from the bond 31, as shown by way of example in FIGS. 2 and 6.

Figure 2:
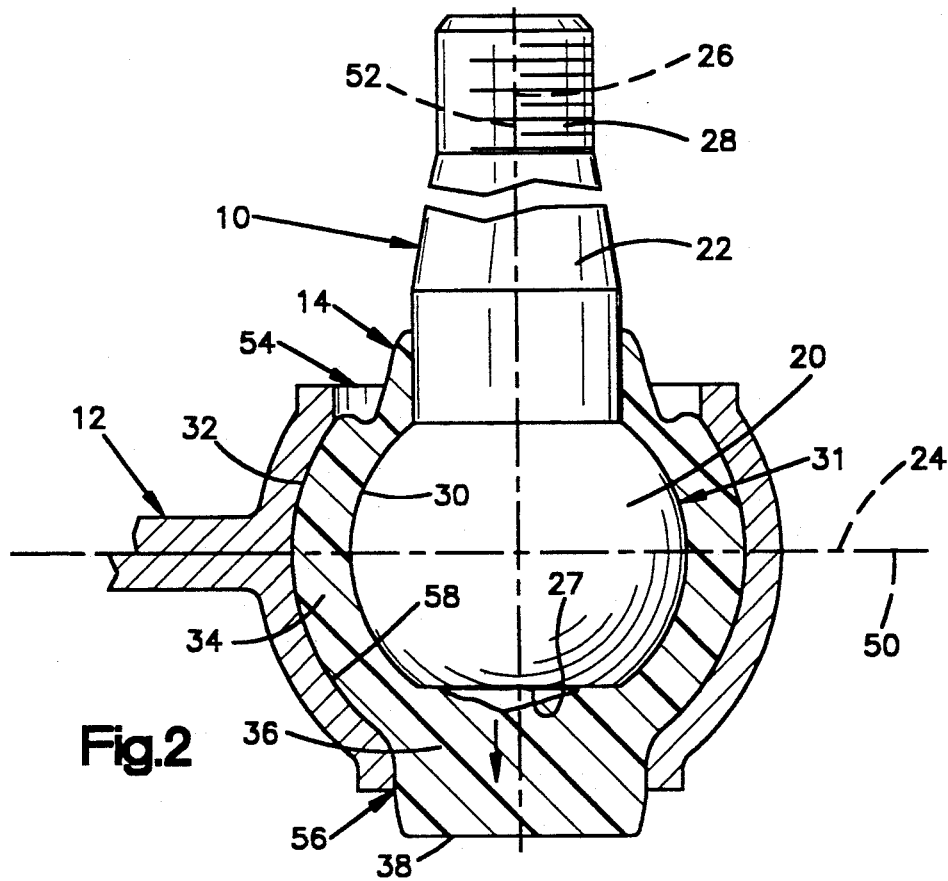
FIG. 2 is a view of the ball joint of FIG. 1 showing the service life indicator in a shifted position.
Figure 6:
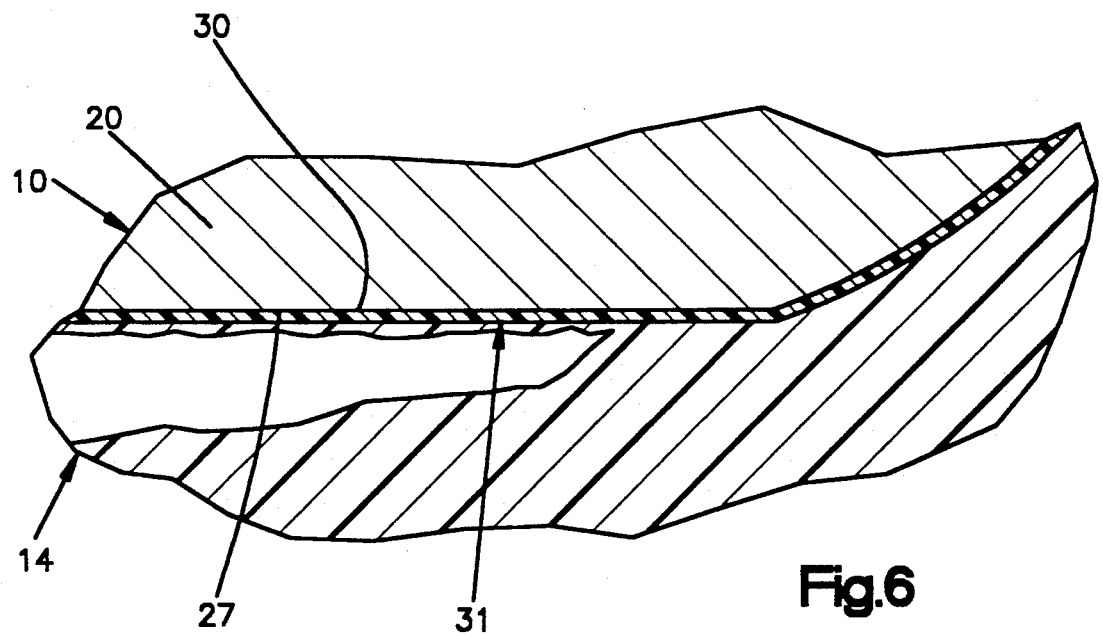
FIG. 6 is an enlarged partial view of the parts shown in FIG. 3 in a condition of failure.

When the elastomeric material of the bearing 14 breaks away from the bond 31, such as shown in FIGS. 2 and 6, the elastomeric material adjacent to the bond 31 is released to move from the bond 31 toward the lower opening 56 in the socket 12. The center of the service life indicator portion 36 then bulges outward along with the periphery thereof as indicated by the arrow in FIG. 2. The service life indicator surface 38 then moves from the concave shape shown in FIG. 1 toward the flattened shape shown in FIG. 2. The service life indicator surface 38 will move out of the concave shape to a degree determined by the degree to which the elastomeric material of the bearing 14 separates from the bond 31. The service life indicator surface 38 would perform in the same manner if the bond 31 itself were to separate from the ball 20. The service life indicator surface 38 thus provides a visual indication of the amount that the bearing 14 has separated from the ball 20.

The bearing 14 can be deformed during assembly in the socket 12 so that the service life indicator surface 38 will move all the way from a concave shape to a flattened shape, or even to a convex shape, in response to a predetermined amount of separation of the bearing 14 from the ball 20. The bearing 14 can thus indicate incipient failure of the ball joint, imminent failure, or total failure, as desired.

From the above description of the invention, those of ordinary skill in the art will perceive improvements, changes and modifications. Such improvements, changes and modifications are intended to be covered by the appended claims.

Having described the invention the following is claimed:

1. A ball joint comprising:
   a socket defining a chamber, a first opening into said chamber, and a second opening into said chamber;
   a stud comprising a ball in said chamber and a shank extending from said ball through said first opening;
   an elastomeric bearing bonded to said ball and supporting said ball for movement in said socket; and
   said bearing having means for indicating separation of said bearing from said ball, said indicating means including a service life indicator surface of said bearing spaced from said ball and extending at least partially across said second opening, and a portion of said bearing which is deformed between said socket and said ball to force said service life indicator surface into a predetermined shape, said service life indicator surface moving out of said predetermined shape in response to separation of said bearing from said ball.

2. A ball joint as defined in claim 1 wherein said predetermined shape is concave, said service life indicator surface being movable out of said concave shape toward a flattened shape in response to separation of said bearing from said ball.

3. A ball joint as defined in claim 1 wherein said bearing has an indicator portion extending through said second opening, said service life indicator surface being on said indicator portion.

4. A ball joint comprising:
   a socket defining a chamber, a first opening into said chamber, and a second opening into said chamber;
   a stud comprising a ball in said chamber and a shank extending from said ball through said first opening;
   an elastomeric bearing bonded to said ball and supporting said ball for movement in said socket, said bearing having a service life indicator surface spaced from said ball; and
   said socket having surface means formed around said bearing to force said service life indicator surface into a predetermined position extending at least partially across said second opening, and to force said service life indicator surface to move out of said predetermined position in response to separation of said bearing from said ball.

5. A ball joint as defined in claim 4 wherein said service life indicator surface has a predetermined shape when in said predetermined position, and moves out of said predetermined shape when moving out of said predetermined position.

6. A ball joint as defined in claim 5 wherein said predetermined shape is concave, said service life indicator surface moving toward a flattened shape and in a direction outward of said second opening when moving out of said concave shape.

7. A ball joint as defined in claim 4 wherein said bearing comprises a service life indicator portion extending out of said second opening, said service life indicator surface being on said service life indicator portion.

8. A ball joint comprising:
   a socket having a first opening, a second opening, and an inner surface defining a chamber;
   a stud comprising a ball in said chamber and a shank extending from said ball out of said first opening;

an elastomeric bearing bonded to said ball and supporting said ball for movement in said chamber, said movement causing stresses which over time cause said bearing to separate from said ball; and said bearing having means for indicating separation of said bearing from said ball, said indicating means including a service life indicator surface spaced from said ball and extending at least partially across said second opening, said service life indicator surface moving in a direction outward of said second opening in response to separation of said bearing from said ball.

9. A ball joint as defined in claim 8 wherein said service life indicator surface changes shape when moving in response to separation of said bearing from said ball.

10. A ball joint as defined in claim 9 wherein said service life indicator surface has an initial concave shape and moves toward a flattened shape in a direction outward of said second opening in response to separation of said bearing from said ball.

* * * * *